United States Patent [19]

Soutsos

[11] 4,291,073

[45] Sep. 22, 1981

[54] METHOD FOR FORMING LUBRICATING FILMS

[76] Inventor: Michael D. Soutsos, 5475 Colorado St., Long Beach, Calif. 90814

[21] Appl. No.: 175,051

[22] Filed: Aug. 4, 1980

[51] Int. Cl.$^3$ .............................................. F16N 15/00
[52] U.S. Cl. ................................... 427/314; 427/318; 427/388.3; 528/153; 260/38
[58] Field of Search ................ 528/153; 148/6.15 R, 148/6.15 Z; 427/388.3; 260/38

[56] References Cited

U.S. PATENT DOCUMENTS

| | | | |
|---|---|---|---|
| 2,463,501 | 3/1949 | Arvin | 528/153 |
| 2,703,768 | 3/1955 | Hall | 148/6.15 R |
| 3,983,304 | 9/1976 | Sekhon | 427/388.3 |

*Primary Examiner*—Ralph S. Kendall
*Attorney, Agent, or Firm*—I. Michael Bak-Boychuk

[57] ABSTRACT

A compound comprising molybdenum disulfide emulsified in a resin of the para phenyl phenol formaldehyde group, diluted in a vehicle of the methylbenzene group in a homogenized emulsion is deposited onto metal surfaces preheated to a surface temperature of 350° to 500° F. The heat stored in the metal promotes quick evaporation of the benzene vehicle while the resin sets. The cure and evaporation of the carrier may be further promoted by baking the coated article in an oven at a temperature of 300° to 500° F.

2 Claims, No Drawings

METHOD FOR FORMING LUBRICATING FILMS

BACKGROUND OF THE INVENTION

1. Field of the Invention

The present invention relates to lubricating films and more particularly to dry lubricant coatings and method of forming and depositing same.

2. Description of the Prior Art

The use of dry lubricants on highly loaded contact surfaces has been known in the past. For example, Molybdenum Disulfide ($MoS_2$), in powdered form, has been used extensively as an assembly lubricant on wrist and link pin surfaces in various engines, the powder providing extremely good lubricating qualities. The use of powder, however, presents many disadvantages in the course of use particularly where the powder is of the fine kind and of pervasive characteristics. For this reason bonding agents have been sought in the past which in one way or another fix the dry lubricant to the surface selected.

SUMMARY OF THE INVENTION

Accordingly, it is the general purpose and object of the present invention to provide coating having a dry lubricant dispersed therein which may be deposited on any metal surface.

Other objects of the invention are to provide a process in which a dry lubricant is emulsified into a resin for forming a lubricating surface.

Yet additional objects of the invention are to provide a method of depositing an emulsion of dry lubricant in a resin onto metal surfaces.

Briefly, these and other objects are accomplished within the present invention by first mixing 47±5 lbs. of resin of the phenol formaldehyde group with 10±2 gallons of methylbenzene. Thereafter 40±5 lbs. of molybdenite ($MoS_2$) is mixed into 18±4 gallons of methylbenzene. These two mixes are then combined in a drum which is agitated at a frequency of no less than 60 Cps and an amplitude greater than 0.05 inches until homogenized. The result achieved is an emulsion having the relatively inert $MoS_2$ dispersed throughout in a finely homogenized form. It has been found that the resulting homogenized emulsion, either because of the surfactant aspects of the dry lubricant powder or because of the viscosity of the resin-vehicle combination, or both, achieves long shelf life where less than 10% of the emulsified dry lubricant settles to the bottom of the container on a period of 12 weeks. While the exact bases for the stability of this emulsion are not fully perceived, the fine characteristics of the powder and the relatively high viscosity and specific gravity of the resin appear to extend the shelf life, consistent with the operation of Stokes Law.

The foregoing emulsion may be sprayed, brushed or otherwise deposited onto a metal surface which is first preheated to achieve a surface temperature of 300° to 500° F. This preheating cycle is useful both to evaporate and drive off any oils and greases that may be on the surface and to expand any surface irregularities to receive the coating. Once coated the article is returned for further heating for a period of no less than thirty minutes at a surface temperature of 350° to 500° F., during which time the vehicle evaporates and the resin carrying the dry lubricant sets. The resulting coating achieves a bond by virtue of the resin which has a hardness less than that of the $MoS_2$. In use of the resin wears off to expose the imbedded $MoS_2$ which then slide on the adjacent surface. The resin which is preferably of the paraphenyl phenol formaldehyde group, as obtained by catalyzing phenol formaldehyde with a mild acid, forms a film having very few oxygen links and thus protects the molybdenite form oxidation.

DESCRIPTION OF THE SPECIFIC EMBODIMENT

The product described herein may be produced by mixing 47±5 lbs. of resin of the phenol formaldehyde group with 10±2 gallons of methylbenzene. This batch is then combined with a mix of 40±5 lbs. of molybdenite ($MoS_2$) and 18±4 gallons of methylbenzene. In the foregoing weight and volume ratios a standard 45 gallon drum may be utilized for agitation until the mix is fully homogenized.

An article to be coated with the foregoing emulsion is first preheated until a surface temperature of 350° to 500° F. is reached. During this time any oil films of other surface contaminants evaporate and the surface is thus prepared for the coating. The above emulsion is then deposited onto the article surfaces and the article is returned for heating to a surface temperature of 300° to 500° F. for a period of 0.5-0.75 hours. In this last heating cycle, any traces of the vehicle evaporate and the resin sets up.

The article thus coated will retain the dry lubricant dispersed in a resin coat having few oxygen links. As the resin is worn off any friction contact is across new grains of $MoS_2$. For the purposes herein, the $MoS_2$ may be of the purity and consistency equal to the $MoS_2$ powder sold by Transamerica Delaval Inc., Oakland, Calif. under the Part No. B-6099-9 and the Methylbenzene may be of the quality equal to that sold by Shell Chemical Company, Houston, Tex. under the trade name Shell Toluene. The resin may be like that sold by Varcum Chemical, Niagara Falls, N.Y., under the Part No. 523 and is of the parphenyl phenol formaldehyde type.

The foregoing coating provides all the lubricating aspects of $MoS_2$ in a resin which because of its relative softness does not wear the contact surface. Furthermore, the resin protects the unexposed molybdenite from oxidation until it is exposed by wear. It is to be understood that in the foregoing example mix relationships based on standard size drums are set up. Batch sizes of higher or lower volume can be made by simply maintaining the foregoing ratios.

Obviously many modifications and changes can be made to the foregoing description without departing from the spirit of the invention. It is therefore intended that the scope of the invention be determined solely on the claims appended hereto.

What is claimed is:

1. A method of coating articles with a dry lubricating film comprising the steps of:
   heating the article until a surface temperature of 300°-500° F. is achieved thereon;
   depositing an emulsion of powdered molybdenum disulfide emulsified in a solution of methylbenzene and paraphenyl phenol formaldehyde; and
   heating the coated article in an oven at a temperature of 300°-500° F. until the solution sets up.

2. A method according to claim 1 further comprising the step of:
   forming said emulsion by combining said molybdenum disulfide with said methyl benzene in the proportions of 40±5 lbs. to 10±2 gallons and said paraphenyl phenol formaldehyde and said methylbenzene in the proportion of 47±5 lbs. to 18±4 gallons and thereafter mixing and agitating said combinations.

* * * * *